United States Patent [19]

Comstock

[11] 4,263,527

[45] Apr. 21, 1981

[54] CHARGE CONTROL OF PIEZOELECTRIC ACTUATORS TO REDUCE HYSTERESIS EFFECTS

[75] Inventor: Robert H. Comstock, West Acton, Mass.

[73] Assignee: The Charles Stark Draper Laboratory, Inc., Cambridge, Mass.

[21] Appl. No.: 39,901

[22] Filed: May 17, 1979

[51] Int. Cl.³ .......................................... H01L 41/08
[52] U.S. Cl. .................................................. 310/316
[58] Field of Search ...................... 310/316, 317, 314; 318/116, 118

[56] References Cited

U.S. PATENT DOCUMENTS

| | | | |
|---|---|---|---|
| 3,100,886 | 8/1963 | Marks | 310/317 X |
| 3,835,338 | 9/1974 | Martin | 310/317 X |
| 3,879,699 | 4/1975 | Pepper | 310/317 X |
| 3,916,226 | 10/1975 | Knoll | 310/317 |
| 4,093,883 | 6/1978 | Yamamoto | 310/317 |

Primary Examiner—Mark O. Budd
Attorney, Agent, or Firm—Weingarten, Maxham & Schurgin

[57] ABSTRACT

A piezoelectric actuator and a control circuit therefor to apply a charge to the actuator proportional to an input signal magnitude. The charge controlled actuator achieves a more linear input-displacement response with reduced hysteresis.

11 Claims, 4 Drawing Figures

CHARGE CONTROL OF PIEZOELECTRIC ACTUATORS TO REDUCE HYSTERESIS EFFECTS

FIELD OF THE INVENTION

This invention relates to piezoelectric actuators and, in particular, to high gain piezoelectric actuators controlled by the applied charge in order to reduce hysteresis effects in the displacement response.

BACKGROUND OF THE INVENTION

Piezoelectric actuators are used in a variety of applications where it is desired to obtain electronic control over small physical displacements. One such application is the piezoelectric actuated deformable mirror comprising, for example, a peripherally clamped reflecting membrane having one or more regions coupled to respective piezoelectric actuators. The displacement of the piezoelectric actuators and, hence, the geometry of the reflective membrane can be controlled by the voltage applied to the actuators.

One difficulty that has arisen in the use of piezoelectric actuators is the problem of hysteresis effects. High gain piezoelectric ceramics typically exhibit a large ferroelectric effect which manifests itself as hysteresis in the displacement versus voltage response as the applied voltage cycles between two values. As a consequence of these hysteresis effects, the displacement response curve tends to form a loop rather than a straight line with the consequence that displacement is not precisely linear with voltage and is not a single valued function of voltage.

These hysteresis effects pose severe problems in applications where highly accurate dimensional control is required. The variation in displacement at the mid-loop voltage value can be as high as twenty percent for typical high gain actuators; and because displacement is not a single-valued function of voltage, actuator displacement control cannot be obtained by simply controlling the actuator voltage.

Prior attempts to overcome this problem have typically resulted in bulky apparatus which additionally is either highly expensive or unduly slow in frequency response. One such approach involves adding position transducers to monitor displacement in a feedback loop. These position transducers, however, are bulky and expensive.

Another involves foregoing the use of high gain piezoelectric materials and using, in their place, lower gain piezoelectric materials chosen for low hysteresis and arranged in long stacks to accomplish the desired displacement. The difficulty with this approach is such actuators are typically bulkier and have a lower frequency response than those made from high gain material.

A third approach is disclosed in U.S. Pat. No. 3,916,226 issued to D. B. Knoll. Knoll regulates the piezoelectric actuator by utilizing a specifically formed excitation waveform. The actuator is supplied with a constant current over a predetermined first time interval establishing a charge of a first polarity which is then completely withdrawn during a second time interval to return the transducer to its initial value. The Knoll approach, however, is unduly complex.

Accordingly, it is desirable to provide an improved piezoelectric actuator design for reducing the effects of hysteresis.

SUMMARY OF THE INVENTION

In accordance with the invention, the displacement of a piezoelectric actuator is controlled through an electrical input control signal by applying to the actuator an electrical charge proportional to the input signal, rather than by applying a corresponding voltage or current. The control for the actuator responds to an input signal to drive the actuator to a charge which corresponds to the input signal magnitude. In a preferred embodiment, control is effected by a differential amplifier feedback arrangement which senses actuator charge and forces the charge on the actuator to be proportional to the input signal. With this arrangement, the mid-loop variation of displacement is reduced to about one-fifth of its value for comparable actuators controlled by voltage alone.

BRIEF DESCRIPTION OF THE DRAWINGS

The nature, advantages and various features of the invention will appear more fully upon consideration of the illustrative embodiments now to be described in detail in connection with the accompanying drawings.

In the drawings.

For convenience of reference, the same structural elements are given the same reference numeral throughout the drawings.

DETAILED DESCRIPTION OF THE DRAWINGS

Figure 1:
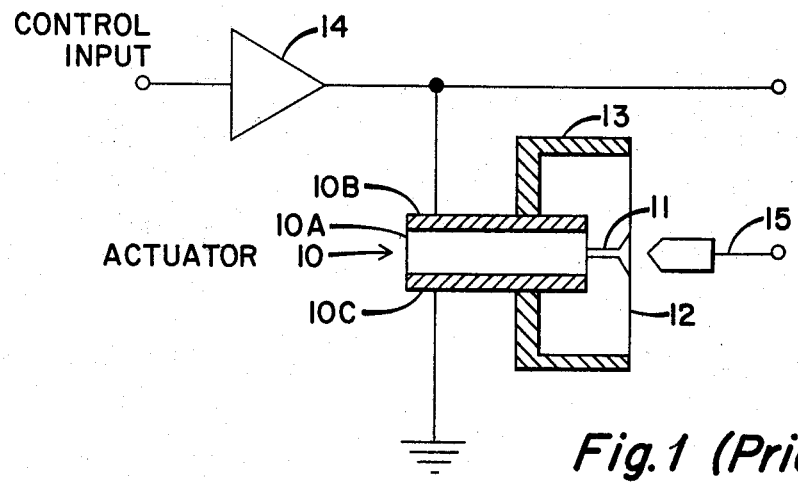
FIG. 1 illustrates a typical prior art arrangement for driving a piezoelectric actuator with a voltage proportional to an input control signal.

Referring to the drawings, FIG. 1 illustrates a typical prior art voltage-controlled piezoelectric actuator used in conjunction with a simplified deformable mirror. In essence, the device comprises a piezoelectric actuator 10, comprising a piezoelectric body 10A electrically coupled between a pair of electrodes 10B and 10C, coupled via projection 11 to the central portion of a deformable reflecting membrane 12. The peripheral portion of the membrane 12 is fixed or clamped to a fixed support structure 13. The actuator is typically electrically coupled between the output of an amplifier 14 and ground.

In operation, an electrical control input signal is applied to amplifier 14 which, in turn, applys a proportional control voltage to the piezoelectric actuator 10. The actuator, in response, mechanically deforms in approximate proportion to the input voltage, moving projection 11 and thereby deforming membrane 12. Variations in the input signal thus produce corresponding variations in the deformation of membrane 12. The amount of such deformation can be conveniently measured by a Kaman proximity probe 15 disposed adjacent the coupling of projection 11 and membrane 12.

Figure 2:
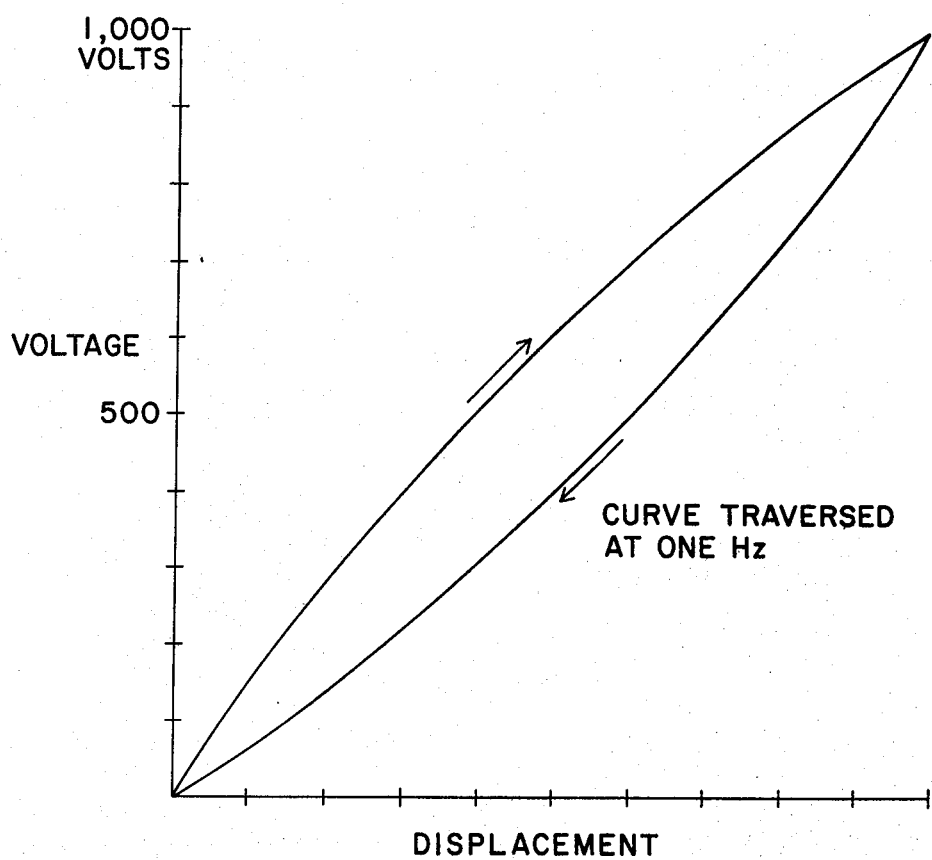
FIG. 2 is a graphic illustration of the displacement versus control voltage characteristics of the prior art actuator of FIG. 1, illustrating the problem presented by hysteresis effects.

The problem of hysteresis effects encountered by such a prior art arrangement are illustrated in FIG. 2 which shows a plot of measured displacement as a function of amplifier output voltage for voltage values cycled between 0.0 and 1000 volts to a maximum displacement of about $1.8 \times 10^{-3}$ inch. As illustrated, at the mid-loop voltage of 500 volts, the displacement varies a substantial proportion of its average value depending on whether the voltage is rising or falling. Thus displacement is not a single-valued function of voltage and accurate positioning is not possible.

Figure 3:
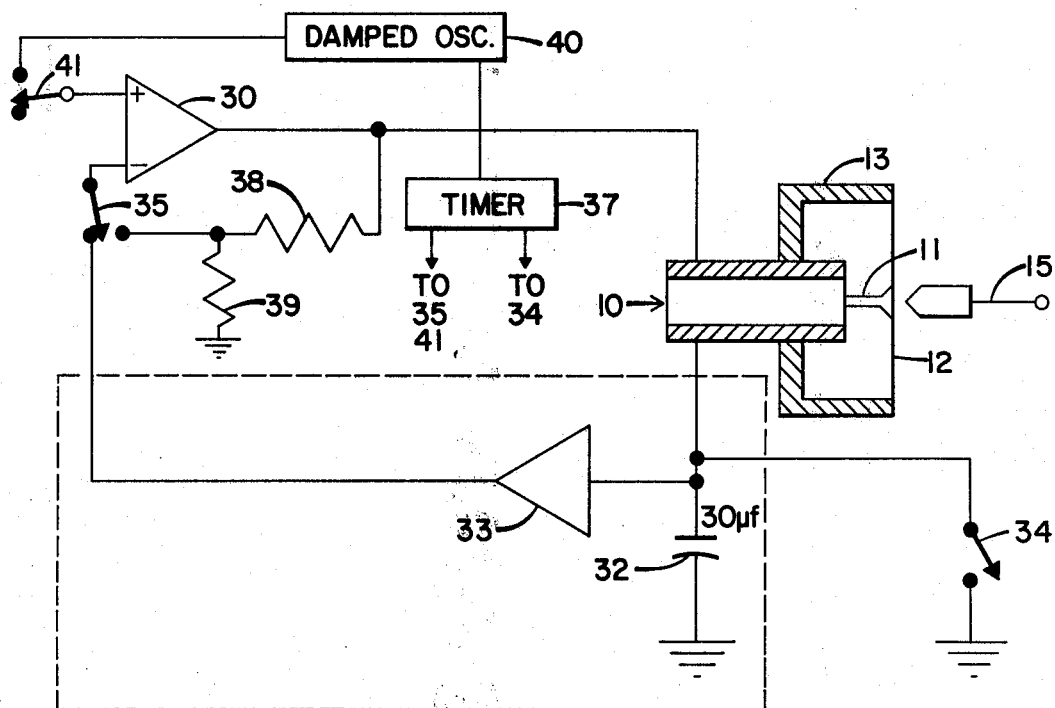
FIG. 3 illustrates a preferred embodiment of a charge controlled piezoelectric actuator in accordance with the invention.

FIG. 3 illustrates a preferred embodiment of a charge-controlled piezoelectric actuator in accordance with the invention and which greatly reduces these hysteresis effects permitting accurate signal control over displacement. The device of the invention comprises a piezoelectric actuator 10, such as a stack of high gain ceramic piezoelectric wafers of the type exhibiting an appreciable hysteresis, such as by the ferroelectric effect electrically connected in parallel, means for receiving an input signal, such as the noninverting input terminal of a differential amplifier 30, and means such as feedback loop 31, for producing on the piezoelectric actuator a level of charge proportional to the input signal.

The feedback loop preferably comprises means for producing a signal proportional to the actuator charge, such as series capacitor 32, and a high impedance buffer amplifier 33, for feeding back to the inverting input terminal of differential amplifier 30, a feedback voltage signal proportional to the actuator charge.

In operation, upon application of an input control signal the voltage output of amplifier 30 induces opposite charges on the surfaces of piezoelectric body 10A in contact with electrodes 10B and 10C respectively. These charges, in turn, induce a charge differential between the electrodes of series capacitor 32, thereby producing between the capacitor and ground a voltage proportional to the charge on the actuator. This voltage is fed back through amplifier 33 and a normally closed switch 35 to the inverting terminal of differential amplifier 30, thereby changing the output of amplifier 30 and, as a consequence, the charge on actuator 10. The feedback arrangement thereby quickly forces the charge on actuator 10 to a value proportional to the input control signal.

The actuator system may drift over a period of time, varying the proportionality between the input signal and actuator displacement. An initialization circuit is provided to recenter the actuator response to the center point, 36, of the response curve of FIG. 4. This circuit includes switch 34 which selectively bypasses capacitor 32 under the control of a timer 37, and feedback resistor 38 which is selectively connected from the output of amplifier 30 to its inverting input through switch 35, also controlled by timer 37. A resistor 39 is connected to ground from the inverting input of amplifier 30 through switch 35 to establish the gain of amplifier 30 in the initialization mode as the ratio of resistors 38 and 39. This gain is typically set at the nominal gain of the system in the closed loop condition.

Switches 34 and 35 are controlled by timer 37 to bypass capacitor 32 and connect resistor 38 around amplifier 30 in the initialization mode. In controlling this sequence, it is important that switch 34 not be closed while loop 31 is in the circuit, or high voltages will appear at amplifier 30 output.

A switch 41 is also provided to divert the input to amplifier 30 from the normal input signal, to the output of a damped oscillator 40. Oscillator 40 is activated by the timer 37 to provide a down ramped, low frequency oscillation to amplifier 30 that is applied during initialization to oscillate the system about point 36, in gradually diminishing amplitude. In this manner the system ultimately winds up at point 36. Oscillator 40 may be realized as a down ramp modulation of 0.1 second duration of a low frequency sine-wave oscillator. The initial signal excursions on the FIG. 4 curve are fullscale.

Figure 4:
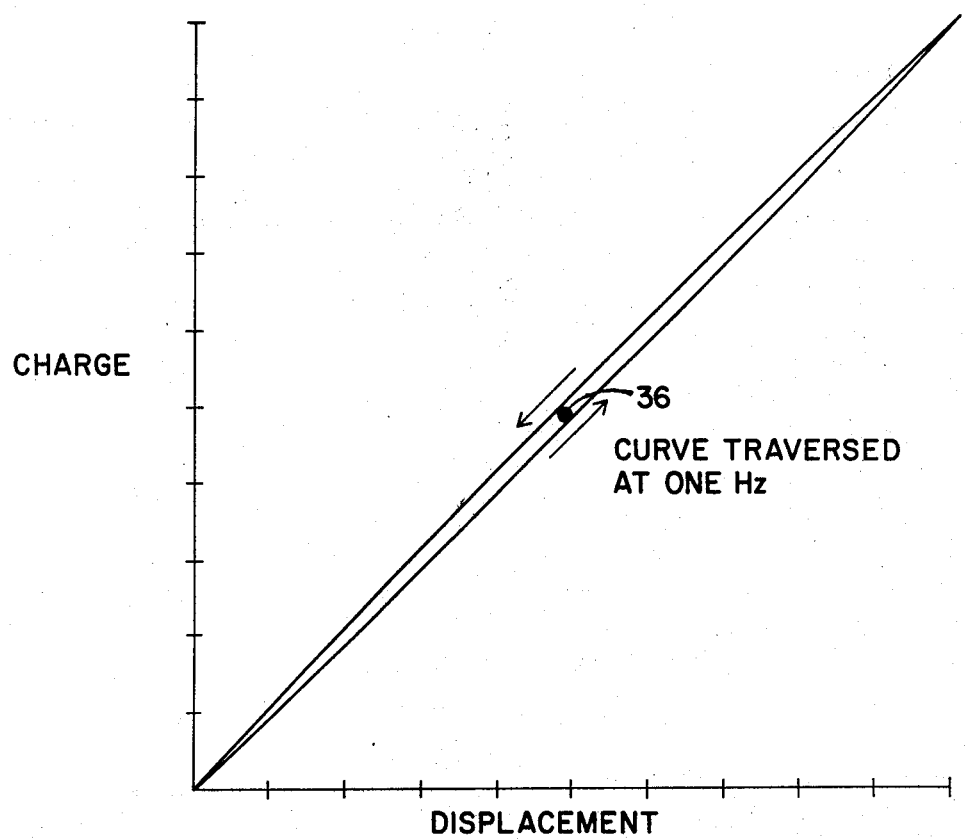
FIG. 4 is a graphical illustration of the displacement versus charge characteristics of the device of FIG. 3.

FIG. 4 is a graphical illustration of the displacement versus charge characteristics of the device of FIG. 3 useful in understanding the utility of the invention. As can be seen by comparing FIG. 2 with FIG. 4, the extent of displacement variation during voltage cycling to a given maximum displacement is much greater than the extent of displacement variation during charge cycling. Specifically, the use of charge control in accordance with the invention has been observed to reduce the displacement uncertainty by a factor of approximately five without requiring the addition of position transducers, the use of multi-stacked, lower gain piezoelectric materials, or the use of specific excitation waveforms.

While the invention has been described in connection with a specific embodiment, it is to be understood that these are merely illustrative of the many other specific embodiments which can also utilize the principles of the invention. Thus numerous and varied devices can be made by those skilled in the art without departing from the spirit and scope of the present invention.

I claim:

1. Piezoelectric apparatus for controllably displacing one object with respect to another in response to an electrical input signal comprising:
   piezoelectric actuator means for displacing such object and electrically charging in response to an applied electrical signal;
   first circuit means responsive to the level of charge on said piezoelectric actuator means for producing a feedback signal in substantial proportion to said level of charge; and
   second circuit means jointly responsive to said electrical input signal and said feedback signal for applying to said actuator means said applied electrical signal for producing on said actuator a level of charge substantially proportional to said input signal.

2. A piezoelectric apparatus according to claim 1 wherein said piezoelectric actuator comprises one or more high gain piezoelectric wafers of the type exhibiting hysteresis.

3. A piezoelectric apparatus according to claim 2 wherein said piezoelectric actuator includes wafers exhibiting a strong ferroelectric effect.

4. A piezoelectric apparatus according to claim 1 wherein:
   said second circuit means comprises circuit means for driving said piezoelectric actuator by a signal proportioned in accordance with the difference between said input signal and said feedback signal in such a manner as to drive said level of charge toward the level of said input signal.

5. A piezoelectric apparatus according to claim 1 wherein:
   said second circuit means comprises amplifying means responsive to said input signal and said feedback signal for amplifying the difference between said signals and applying the amplified difference to said piezoelectric actuator.

6. A piezoelectric apparatus according to claim 5 wherein:
   said input signal is a voltage signal;
   said means for generating a signal proportional to said level of charge comprises capacitor means serially coupled to said piezoelectric actuator for producing a voltage proportional to said charge; and
   said amplifying means comprises a differential amplifier having a non-inverting input terminal for receiving said input signal, an inverting terminal for receiving said signal proportional to said charge, and an output terminal for driving said piezoelectric actuator in accordance with the difference between said signals.

7. A piezoelectric apparatus according to claim 6 including initialization circuit means for correlating a nominal input signal with mid-range displacement of the actuator.

8. A piezoelectric apparatus according to claim 7 wherein said initialization circuit means includes means for selectively by-passing said capacitor means.

9. A piezoelectric apparatus according to claim 8 wherein said initialization circuit means includes means for replacing the charge proportional signal at the inverting terminal of said amplifying means with a signal derived from the output of said amplifying means.

10. The piezoelectric apparatus according to claim 9 wherein said initialization circuit means includes means for applying a down-ramped sinusoid to said amplifying means.

11. A piezoelectric apparatus according to claim 1 including initialization circuit means for correlating a nominal input signal with mid-range displacement of the actuator.

* * * * *